United States Patent
Katakura et al.

(10) Patent No.: US 6,549,839 B2
(45) Date of Patent: Apr. 15, 2003

(54) VEHICLE DRIVE SYSTEM

(75) Inventors: Shusaku Katakura, Yokosuka (JP); Masahiro Iriyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/021,076

(22) Filed: Dec. 19, 2001

(65) Prior Publication Data
US 2002/0095248 A1 Jul. 18, 2002

(30) Foreign Application Priority Data
Dec. 22, 2000 (JP) ........................ 2000-389931

(51) Int. Cl.$^7$ .................... G06F 19/00; B60K 41/04
(52) U.S. Cl. .................. 701/54; 701/21; 701/29; 701/64; 477/41; 477/43; 477/46; 477/54; 477/68; 123/399; 123/492; 192/75
(58) Field of Search ................ 701/54, 51, 29, 701/64; 477/41, 43, 46, 54, 68, 77, 90, 107, 108, 115; 192/75; 123/399, 492, 493

(56) References Cited

U.S. PATENT DOCUMENTS

| | | | | |
|---|---|---|---|---|
| 5,735,244 A | * | 4/1998 | Machida et al. | 123/399 |
| 5,853,350 A | * | 12/1998 | Hasegawa et al. | 477/166 |
| 5,916,059 A | * | 6/1999 | Takiguchi | 477/152 |
| 6,049,751 A | * | 4/2000 | Palmeri | 701/51 |
| 6,098,001 A | * | 8/2000 | Yuasa | 701/51 |
| 6,188,943 B1 | * | 2/2001 | Uchida et al. | 701/54 |
| 6,254,508 B1 | * | 7/2001 | Kojima et al. | 477/109 |
| 6,328,671 B1 | * | 12/2001 | Nakajima et al. | 477/46 |
| 6,374,170 B1 | * | 4/2002 | Kresse et al. | 701/51 |

FOREIGN PATENT DOCUMENTS

JP   11-078620   3/1999

* cited by examiner

Primary Examiner—Thomas G. Black
Assistant Examiner—Tuan C To
(74) Attorney, Agent, or Firm—Foley & Lardner (57) ABSTRACT

A controller 10 calculates a target drive force based on an accelerator pedal operation amount and a vehicle speed. A speed ratio for calculating a target engine torque is calculated based on the state of the transmission 2. The target engine torque is calculated by dividing the target drive force with the speed ratio for calculating the target engine torque. The torque of the engine 1 is controlled so that the torque of the engine 1 coincides with the target engine torque. During reverse vehicle operation, the speed ratio for calculating target engine torque is corrected to a larger value. In this manner, it is possible to suppress the drive force during reverse vehicle operation while using almost all processes for calculating the target drive force in common during forward and reverse vehicle operation.

6 Claims, 9 Drawing Sheets

VEHICLE DRIVE SYSTEM

FIELD OF THE INVENTION

This invention relates to a vehicle drive system.

BACKGROUND OF THE INVENTION

JP-A-H11-78620 published by the Japanese Patent Office in 1999 discloses a vehicle drive system. This system is used in a vehicle mounting a continuously variable transmission. A target engine torque is calculated by dividing a target drive force by the actual speed ratio. In this manner, an optimal target engine torque is produced which constantly corresponds to the speed ratio without the need for a complicated control routine. Furthermore the step change of the drive force before and after the speed change is suppressed to a minimum.

SUMMARY OF THE INVENTION

Acceleration requirements (target drive force) when the vehicle is reversing are lower than acceleration requirements when the vehicle is moving forward. Thus, if the drive force control is also performed when the vehicle is reversing, performance characteristics, which are different from the characteristics for forward running, are required during reverse running.

In this context, it has been proposed to prepare respective target drive force maps for forward and reverse vehicle operation as a method of differentiating from performance characteristics used during forward vehicle performance. However control routines are complicated by the need to switch between the maps used for forward and reverse vehicle operation. Furthermore this arrangement also has a disadvantage that the capacity of a ROM must be increased in order to store the designated reverse operation target drive force map.

It is therefore an object of this invention to realize drive force control corresponding to low acceleration requirements of a driver during reverse vehicle operation by using a simple structure. It is a further object of this invention to suppress the generation of shift shocks when switching between forward and reverse vehicle operation.

In order to achieve above object, this invention provides a vehicle drive system comprising an engine, an automatic transmission connected to the engine, a sensor which detects a running condition of the vehicle, a sensor which detects an operational condition of the transmission, and a controller. The controller functions to calculate a target drive force based on the running condition of the vehicle, calculate a first value based on the state of the transmission, set the first value as a speed ratio for calculating a target engine torque during forward vehicle operation, set a second value calculated by correcting the first value to a larger value as the speed ratio for calculating the target engine torque during reverse vehicle running, calculate the target engine torque by dividing the target drive force by the speed ratio for calculating the target engine torque and control the engine so that the engine torque coincides with the target engine torque.

The details as well as other features and advantages of this invention are set forth in the remainder of the specification and are shown in the accompanying drawings.

DESCRIPTION OF THE PREFERRED EMBODIMENTS

Figure 1:
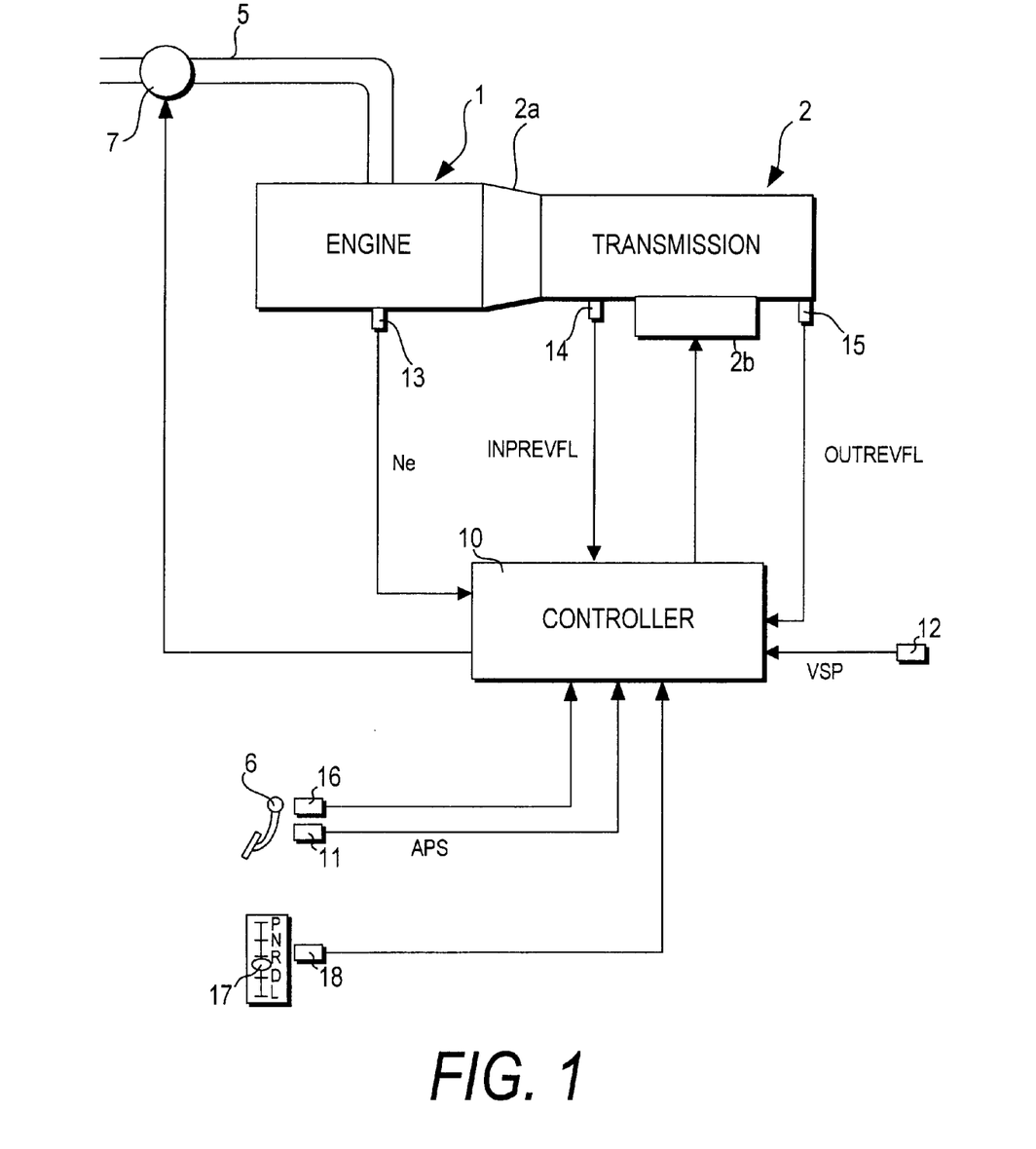
FIG. 1 is a schematic diagram of a vehicle drive force system according to this invention.
Figure 2:
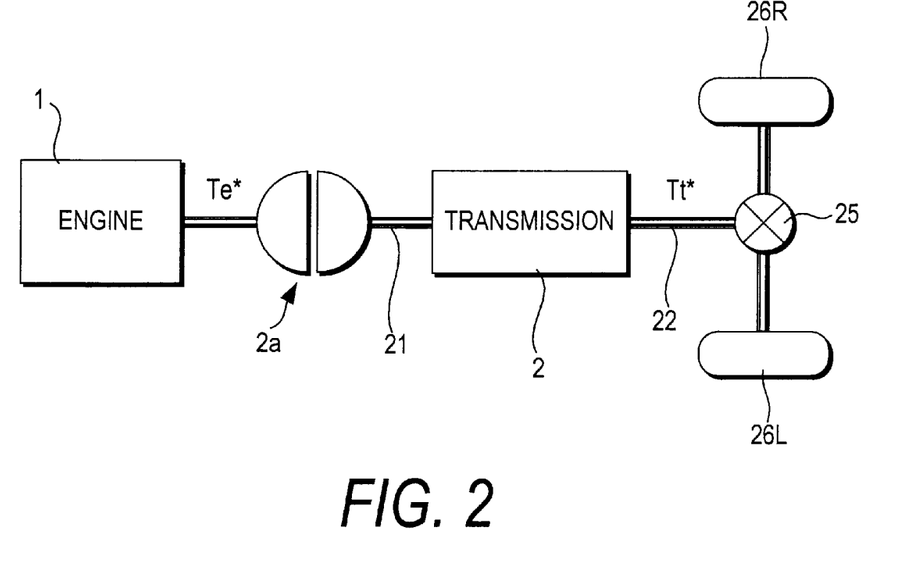
FIG. 2 is a schematic diagram of a power train for the vehicle.

Referring to FIG. 1 and FIG. 2 of the drawings, an automatic transmission 2 is connected to an engine 1 with a torque converter 2a interposed therebetween.

An electronically controlled throttle 7 is provided in an intake air passage 5 of the engine 1 to control the throttle opening independently from the operation of an accelerator pedal 6 by the driver. The torque of the engine 1 is transmitted to the drive wheels 26R, 26L via the torque converter 2a, the transmission 2, an output shaft 22 and a differential gear 25.

The transmission 2 is provided with a planetary gear set, a clutch, a band brake and a hydraulic control circuit 2b. This transmission 2 can vary the speed ratio in a step manner. For example, the speed ratio can be changed in a step manner by switching the gear position between any of the first to fifth gears and reverse gear. The speed ratio is the ratio of the output rotation speed to the input rotation speed of the transmission 2.

A shift solenoid, a line pressure solenoid, a lock-up solenoid and the like are provided on the hydraulic control circuit 2b. These solenoids are controlled by a controller 10.

Signals from an accelerator pedal operation sensor 11 which detects an operation amount APS of the accelerator pedal 6, a vehicle speed sensor 12 which detects a vehicle speed VSP, an engine rotation speed sensor 13 which detects an engine rotation speed Ne, an input rotation speed sensor 14 which detects a rotation speed INPREVFL of a transmission input shaft 21, an output rotation speed sensor 15 which detects a rotation speed OUTREVFL of the transmission output shaft 22, an idle switch 16 which detects that the accelerator pedal 6 is released, and from an inhibitor switch 18 which detects the position of a select lever 17 are input into the controller 10. The controller 10 selects a gear position by looking up a predetermined shift map based on the accelerator operation amount APS and the vehicle speed VSP and then switches the gear of the transmission 2 by switching the shift solenoid of the hydraulic control circuit 2b between the ON and the OFF positions.

The controller 10 controls fuel injection and performs other necessary engine control in order to obtain optimal fuel efficiency and exhaust emission control based on engine operating parameters such as the engine rotation speed Ne. The controller 10 controls the opening of the throttle 7 in order to realize a target engine torque calculated based on the accelerator pedal operation amount APS and the vehicle speed VSP.

Figure 3:
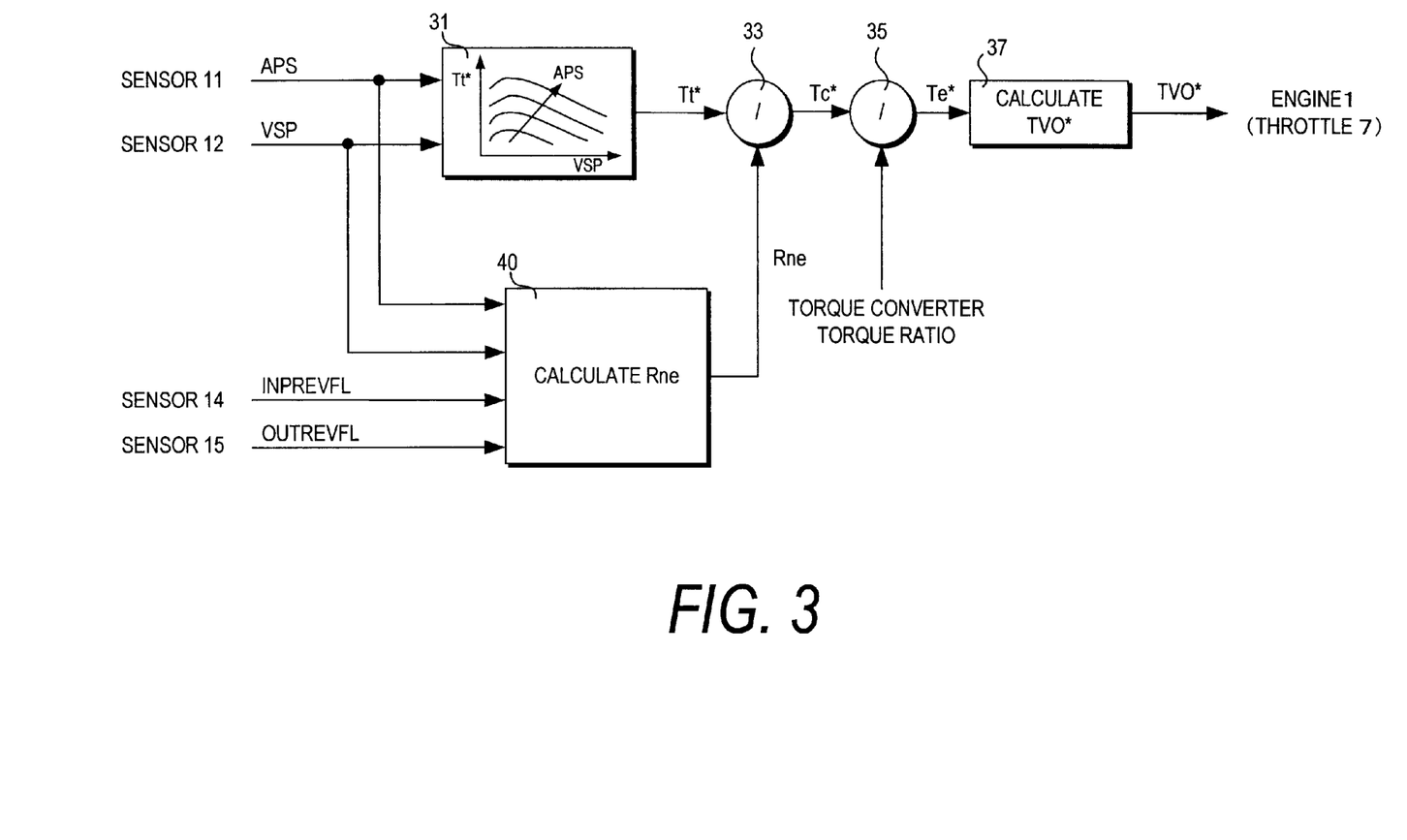
FIG. 3 is a block diagram of drive force control.

FIG. 3 is a block diagram of drive force control performed by the controller 10. As shown in the figure, drive force control comprises a block 31 which calculates a target drive force, dividers 33, 35, a block 37 which calculates a target throttle opening, and a block 40 which calculates a speed ratio for calculation of the target engine torque.

Processing operations performed by each of the above elements will be described hereafter. The block 31 calculates a target engine drive force Tt* for the vehicle based on vehicle running conditions (accelerator pedal operation amount APS and vehicle speed VSP). The block 31 calculates the target drive force Tt* corresponding to the vehicle speed VSP and the accelerator pedal operation amount APS at a given instant by looking up a predetermined target drive force characteristics map.

Figure 4:
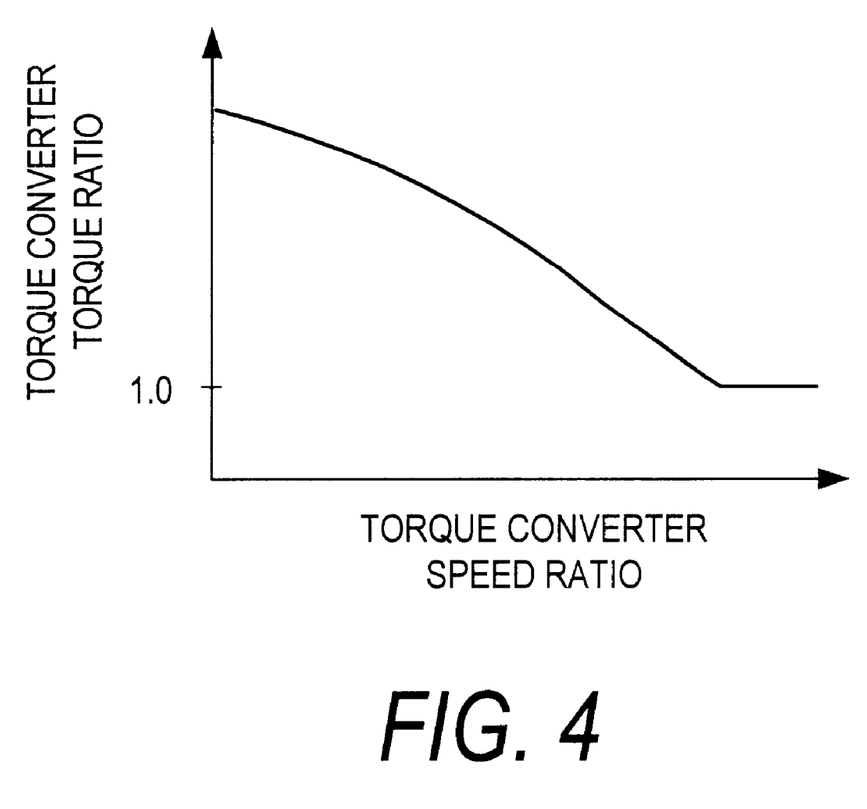
FIG. 4 is a table for calculating the torque converter torque ratio.

The divider 33 calculates a target converter torque Tc* by dividing the target drive force Tt* by a speed ratio Rne from the block 40 which is used for calculating the target engine torque (described hereafter). The divider 35 calculates a target engine torque Te* by dividing the target converter torque Tc* by a torque ratio of the torque converter 2a obtained by looking up a table of characteristics showing the relation of the torque converter torque ratio and the torque converter speed ratio as shown in FIG. 4. The torque converter speed ratio is the ratio of the transmission input rotation speed INPREVFL and the engine rotation speed Ne.

Figure 5:
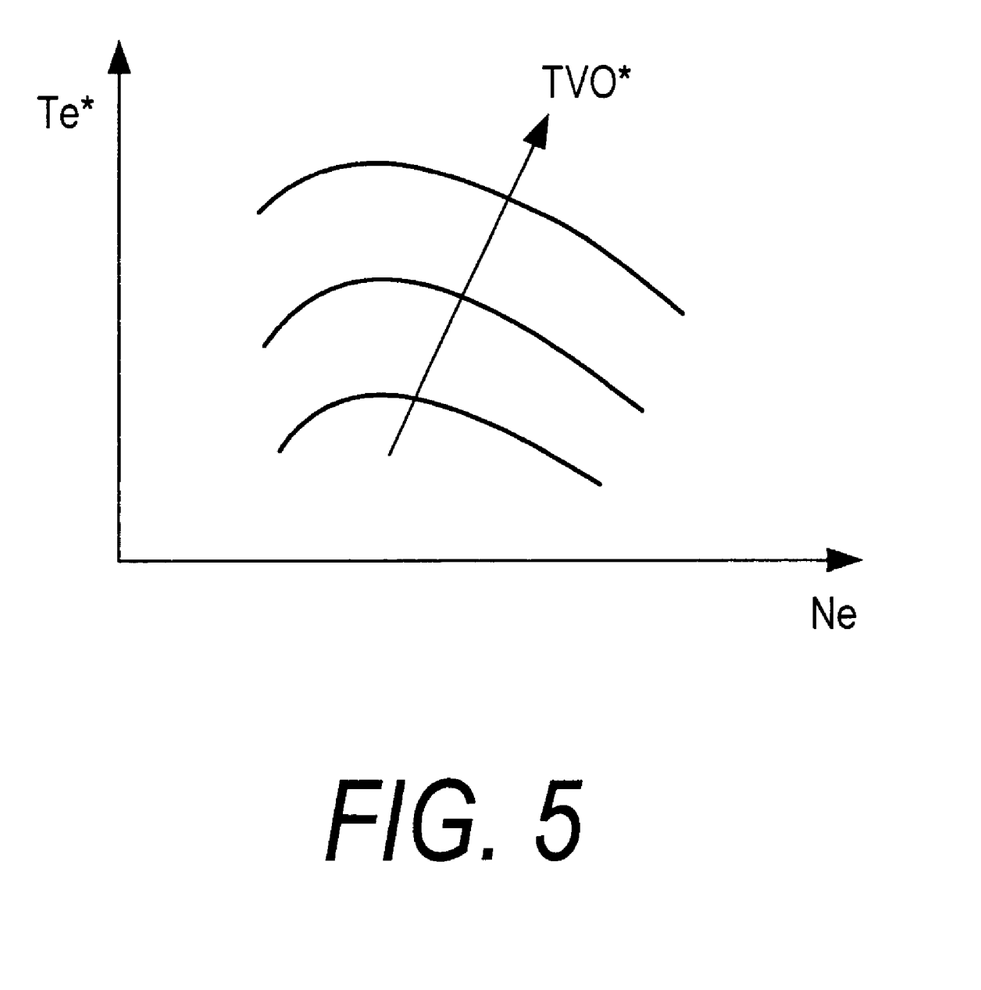
FIG. 5 is a map for calculating the target throttle opening.

The block 37 calculates a target value TVO* for the throttle opening required to realize the target engine torque Te*. The block 37 calculates the target throttle opening TVO* by looking up a characteristics map as shown in FIG. 5 based on the target engine torque Te* and the engine rotation speed Ne. The controller 10 controls the torque of the engine 1 by controlling the throttle 7 so that the opening of the throttle 7 coincides with the target throttle opening TVO*.

The block 40 outputs a speed ratio corresponding to the gear position of the transmission 2 during non-speed change control and outputs an actual speed ratio during speed change. These speed ratios are output as the speed ratio Rne for calculating the target engine torque. In this manner, variation in the drive force during speed change is suppressed. When the vehicle is reversing, a value calculated by correcting above speed ratios to larger side is output as the speed ratio Rne for calculating the target engine torque and thus suppresses the drive force during reverse vehicle operation.

Figure 6:
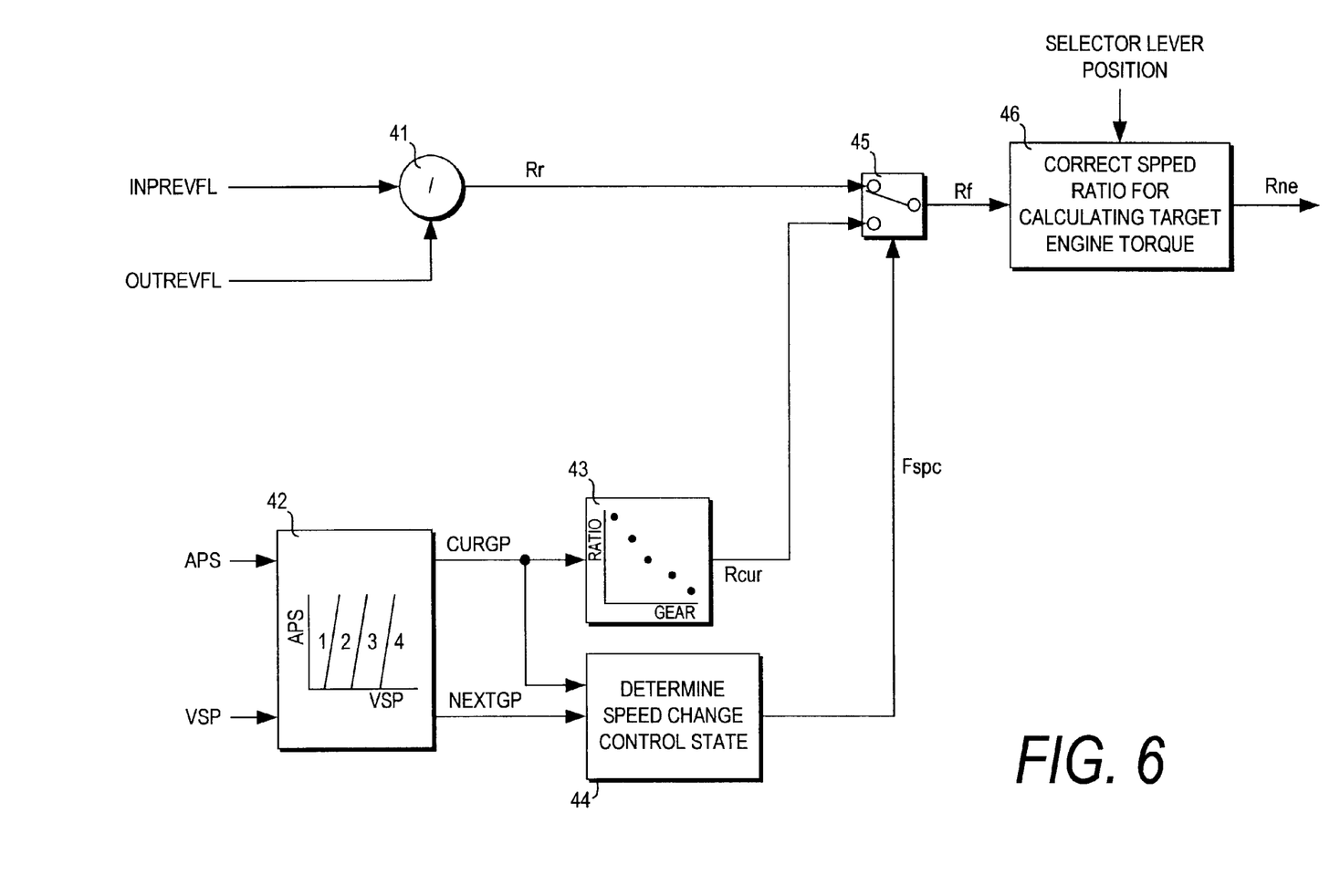
FIG. 6 is a block diagram showing the calculation process of a speed ratio for calculation of the target engine torque.

FIG. 6 shows a calculation routine performed by the block 40 of the speed ratio used to calculate the target engine torque.

As shown in FIG. 6, the block 40 comprises a divider 41, a block 42 determining a gear position, a block 43 converting a gear position into a corresponding speed ratio, a block 44 determining the speed change control state, a block 45 selecting a speed ratio for calculating the target engine torque and a block 46 correcting the speed ratio for calculating the target engine torque. Processing operations performed by each of the above elements will be described hereafter.

The divider 41 calculates the actual speed ratio Rr (=INPREVFL/OUTREVFL) of the transmission 2 based on the input rotation speed INPREVFL and the output rotation speed OUTREVFL of the transmission 2 detected by the sensors 14, 15. During speed change control, it is sometimes the case that the actual speed ratio does not coincide with the speed ratio corresponding to the gear position of the transmission 2.

The block 42 determines a gear position CURGP before speed change and a gear position NEXTGP after speed change which are values used in speed change control based on the accelerator pedal operation amount APS and the vehicle speed VSP. The gear position CURGP before speed change is a value updated to the gear position NEXTGP after speed change when the speed change operation is completed (for example, a value updated to the gear position NEXTGP after speed change when a predetermined time measured by a timer has elapsed after starting speed change). The gear position NEXTGP after speed change is a value obtained in real time by looking up a predetermined shift map as shown in the figure based on the accelerator pedal operation amount APS and the vehicle speed VSP at that time.

The block 43 converts the gear position CURGP to a corresponding speed ratio Rcur (speed ratio before speed change) by looking up a predetermined conversion table.

The block 44 determines whether or not the speed change control is being performed based on the gear position information (CURGP and NEXTGP) for speed change control. More precisely, when it is determined that speed change control is being performed on the basis of a lack of correspondence between the values for gear position information, a speed change control flag Fspc is set to "1" which shows that speed change control is being performed. In contrast, when the values for gear position information are equal, it is determined that speed change control is not performed and the speed change control flag Fspc is set to "0" which shows that speed change control is not being performed.

The block 45 determines whether or not speed change control is performed based on the value for the speed change control flag Fspc set by the block 44. Then the block 45 selects a corresponding speed ratio for use in the calculation of the target engine torque. More precisely, when it is determined that speed change control is being performed, the actual speed ratio Rr is selected as a speed ratio Rf for calculating the target engine torque during forward vehicle operation. When it is determined that speed change control is not being performed, the speed ratio Rcur before speed change is selected as the speed ratio Rf for calculating the target engine torque during forward vehicle operation. The reason that the actual speed ratio Rr is selected during speed change control is to realize the target drive force also during speed change control and to prevent a step change of the drive force during speed change control.

The block 46 determines whether or not the vehicle is reversing based on the select lever position signal from the inhibitor switch 18. When the select lever is in the forward drive range, it is determined that the vehicle is forwarding, and the block 46 outputs the value Rf as the speed ratio Rne for calculating the target engine torque. When the select lever 17 is in the reverse range, it is determined that the vehicle is reversing, and a speed ratio corresponding to reverse gear is corrected to the larger side (corrected to the Low side) and output instead of the value Rf. In this manner, when the vehicle is reversing, a value which is larger than the actual speed ratio is set as the speed ratio Rne for calculating the target engine torque and the value of the target engine torque is decreased. As a result, the realized drive force is suppressed to a value which is smaller than the target drive force. The correction on the speed ratio used for calculation of the target engine torque during reverse vehicle operation is set so that the realized drive force decreases with respect to the target drive force corresponding to a decrease ratio (for example, approximately 70%–90%) of the target drive force used when switching from a forward shift map to a reverse shift map used in a conventional structure which switches target drive force calculation maps during reverse and forward vehicle operation.

When switching between forward and reverse vehicle operation, the block 46 performs the process of limiting the varying speed of the speed ratio for calculating the target engine torque at least when the speed ratio for calculation of the target engine torque becomes small. That is to say, when the speed ratio varies towards the High side. These operations are performed in order to suppress the generation of a shift shock by suppressing sharp increases in engine torque.

Figure 7:
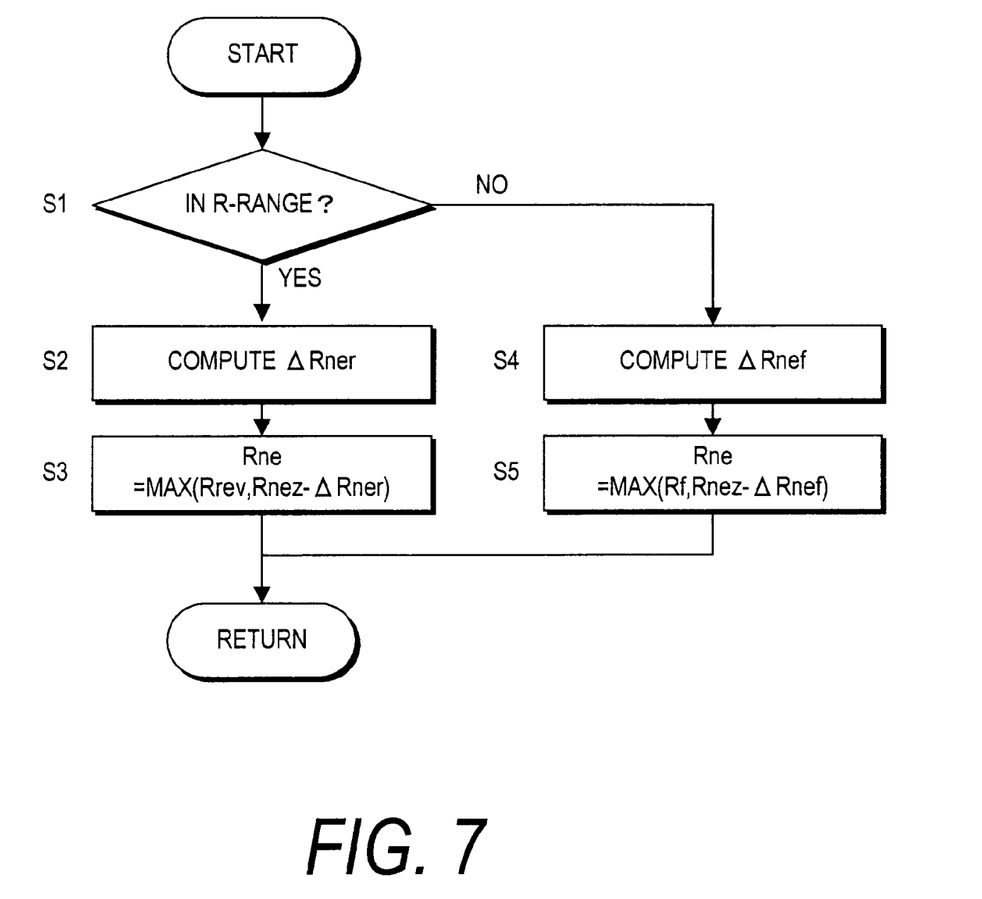
FIG. 7 is a flowchart showing a limiting process on the varying speed of the speed ratio for calculation of the target engine torque performed during switching between forward and reverse vehicle operation.

FIG. 7 shows the limiting process (delay process) on the varying speed of the speed ratio for calculating the target engine torque when switching between forward and reverse vehicle operation.

In this manner, firstly in a step S1, it is determined whether or not the select lever 17 is in the reverse range (R range) based on a signal from the inhibitor switch 18. When it is determined that the select lever 17 is in the reverse range, it is determined that switching from forward to reverse operation is performed and the routine proceeds to a step S2.

In the step S2, a varying speed (shift speed during reverse operation) $\Delta Rner$ for the speed ratio for calculating the target engine torque when switching from forward to reverse operation is calculated based on the accelerator pedal operation amount APS and the vehicle speed VSP by looking up a predetermined table.

Then in a step S3, a value which subtracts the varying speed $\Delta Rner$ from the speed ratio Rnez for calculating the target engine torque during the previous occasion on which the routine was performed is compared with the reverse speed ratio Rrev. The larger of the two values is output as the speed ratio Rne for calculation of the target engine torque. The reverse speed ratio Rrev is not a speed ratio corresponding to the reverse gear but a value in which a speed ratio corresponding to the reverse gear is corrected to a larger value in order to suppress the drive force during reverse operation as described above.

On the other hand, in the step S1, when it is determined that the select lever 17 is not in the reverse range, it is determined that the switching from reverse to forward operation is performed and the routine proceeds to a step S4. A varying speed (non reverse varying speed) $\Delta Rnef$ of the speed ratio for calculating the target engine torque during switching from reverse to forward operation is calculated based on the accelerator pedal operation amount APS, the vehicle speed VSP and the gear position NEXTGP after speed change.

In a step S5, a value which subtracts the varying speed $\Delta Rnef$ from the speed ratio Rnez for calculating the target engine torque on the immediately previous occasion on which the routine was performed is compared with the speed ratio Rf for calculating the target engine torque for forward operation. The larger of the two values is output as the speed ratio Rne for calculation of the target engine torque.

Thus when switching from reverse to forward operation or switching from forward to reverse operation, a value which subtracts the varying speed ($\Delta Rnef$ or $\Delta Rner$) from the speed ratio Rnez for calculating the target engine torque is output as the speed ratio Rne for calculating the target engine torque when the value which subtracts the varying speed ($\Delta Rnef$ or $\Delta Rner$) from the speed ratio Rnez for calculating the target engine torque is greater than the speed ratio after speed change. That is to say, the value is output when the speed ratio decreases before and after speed change control. Thus the varying speed of the speed ratio Rne for calculation of the target engine torque is limited. In contrast, when the value which subtracts the varying speed ($\Delta Rnef$ or $\Delta Rner$) from the speed ratio Rnez for calculating the target engine torque is not greater than the speed ratio after speed change, that is to say, when the speed ratio increases before and after switching, or when the speed ratio Rne for calculating the target engine torque in the above limiting process reaches the speed ratio Rf for calculating the target engine torque for forward vehicle operation, the speed ratio Rf for calculating the target engine torque for forward vehicle operation is output as the speed ratio Rne for calculating a target engine torque.

The process shown in FIG. 7 is terminated when the speed ratio increases before and after switching forward and reverse operation or when the speed ratio Rne for calculating target engine torque reaches the speed ratio after switching during the limiting process.

Although the speed ratio Rne for calculating the target engine torque undergoes gentle variation as a result of limiting the varying speed of the speed ratio Rne for calculating the target engine torque, a first order lag process may also be used in order to realize gentle variation.

Figure 8:
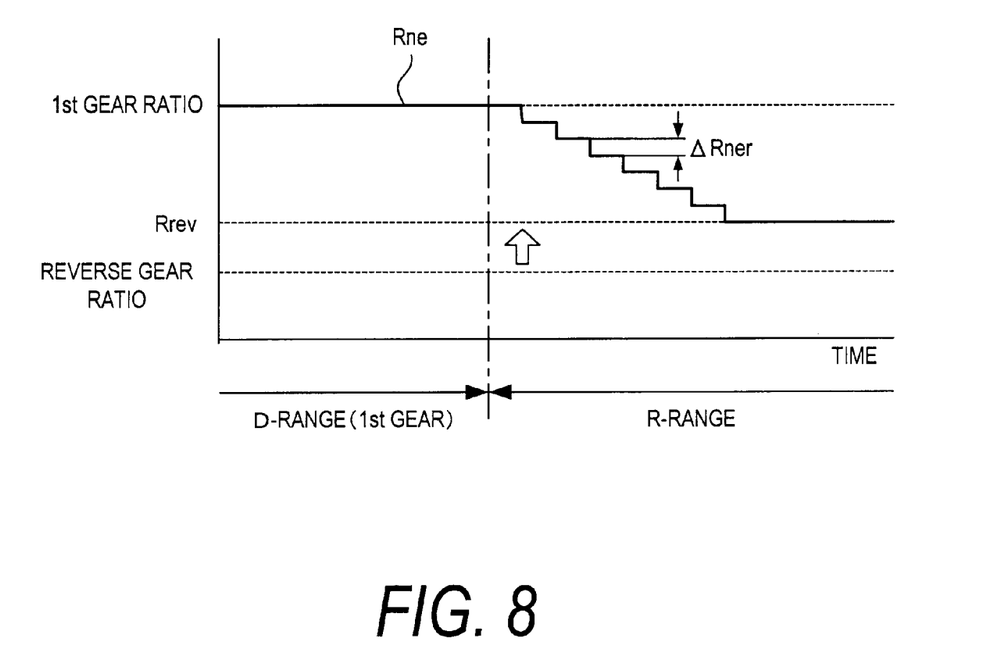
FIG. 8 is a time chart showing variation in the speed ratio for calculation of the target engine torque under the speed limitation when the select lever is operated from the D range (first gear) to the R range.

FIG. 8 shows variation in the speed ratio Rne for calculating the target engine torque when the select lever is operated from the forward drive range (D range) to the reverse range (R range) when the gear position of the transmission 2 is the first gear.

Generally the speed ratio of the reverse gear in an automatic transmission is set between the speed ratio of the first gear and the speed ratio of the second gear. Thus when the gear position is the first gear, the speed ratio decreases when the select lever is operated to the reverse range. There is a tendency for shocks to be produced as a result of increase in the target engine torque when the speed ratio decreases when switching between forward and reverse operation. The drive system according to this invention limits the varying speed of the speed ratio for calculating the target engine torque when switching between forward and reverse vehicle operation as shown in FIG. 8. In this manner, engine torque varies gently and the generation of shocks is suppressed.

In contrast, when the speed ratio before and after switching increases, the engine torque decreases before and after speed change control and shocks tend not to be generated. Thus the limit on the varying speed of the speed ratio for calculating the target engine torque is not applied. However the same limiting process may be performed even when the speed ratio increases and there is sufficient processing capacity in the controller 10.

The overall operation of performing drive force control will be described below.

During drive force control above, the target drive force is calculated based on the accelerator pedal operation amount APS and the vehicle speed VSP. The target engine torque is calculated by dividing the target drive force by the speed ratio for calculating the target engine torque so that the target drive force is realized. The torque of the engine 1 is controlled by the throttle opening. In this manner, the drive force as required by the driver is realized and this allows desired performance characteristics to be maintained.

Figure 9:
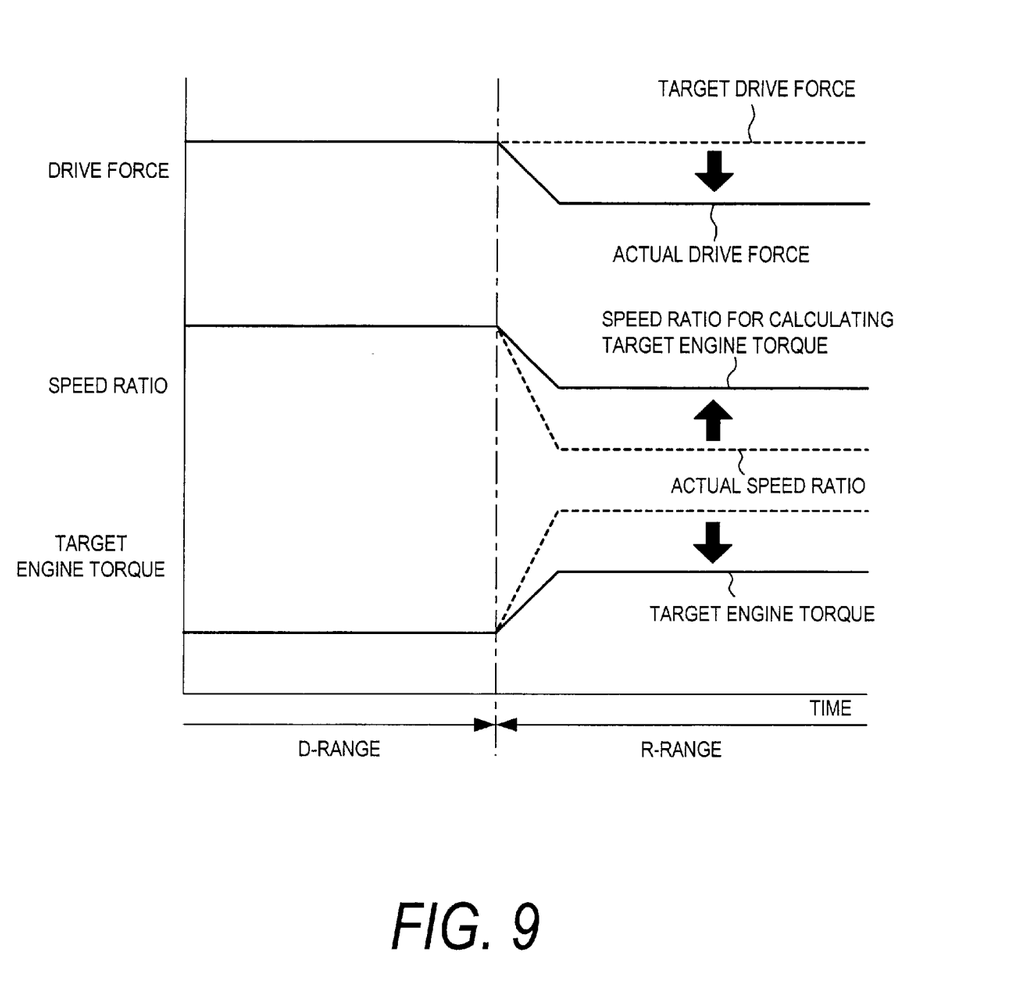
FIG. 9 is a time chart showing respective variation in the drive force, the speed ratio and the target engine torque when the select lever is operated from the D range to the R range.

At this time, the speed ratio corresponding to the gear position of the transmission 2 is used as the speed ratio for calculating the target engine torque when the speed change is not performed and the actual speed ratio is used as the speed ratio for calculating the target engine torque during speed change. As a result, sudden variation in the drive force is suppressed during speed change. Furthermore when the vehicle is reversing, a value which is larger than the actual speed or the speed ratio which corresponds to the gear (reverse gear) of the transmission 2 as shown in FIG. 9 is used as the speed ratio for calculating the target engine torque and as a result the drive force is suppressed during reverse vehicle operation.

In this manner, this invention makes it possible to provide different drive force characteristics during reverse and forward vehicle operation. The main difference in the calculation of the target engine torque during forward and reverse operation comprises the correction process of increasing the value of the speed ratio for calculating the target engine torque during reverse operation. Other processes (processes for calculating the target drive force and the like) can be used both during forward and during reverse operation. This has the advantage that the system is simplified. For example, in an arrangement which calculates the target drive force by looking up a predetermined map, it is possible to use the map in common during forward and reverse operation.

During the correction process for reverse operation, the drive force resulting from the value after correction is corrected by a predetermined rate to be smaller than the target drive force. The predetermined rate is set equal to a decrease ratio of the value obtained by looking up the conventional map for reverse operation and corresponds to the value obtained by looking up the conventional map for forward operation under the same operating conditions.

When the select lever is operated to switch forward and reverse vehicle operation, a delay process is applied to the speed ratio for calculating the target engine torque. In this manner, it is possible to prevent rapid variation in the engine torque as a result of rapid variation in the speed ratio for calculating the target engine torque before and after switching forward and reverse operation. Thus it is possible to suppress the production of shocks.

Such shocks tend to be produced when the speed ratio decreases before and after switching forward and reverse operation, that is to say, when the engine torque increases before and after switching. Thus the above delay process is performed only when the speed ratio before and after switching decreases. In this manner, the generation of shocks which may result in problems is suppressed and at the same time it is possible to reduce the load on the control system.

Furthermore it is possible to adapt this invention in the same manner to a vehicle mounting a continuously variable transmission.

The entire contents of Japanese Patent Application P2000-389931 (filed Dec. 22, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A vehicle drive system comprising:
   an engine;
   an automatic transmission connected to the engine;
   a sensor which detects a running condition of the vehicle;
   a sensor which detects an operational condition of the transmission; and
   a controller functioning to:
      calculate a target drive force based on the running condition of the vehicle;
      calculate a first value based on the state of the transmission;
      set the first value as a speed ratio for calculating a target engine torque during forward vehicle operation;
      set a second value calculated by correcting the first value to a larger value as the speed ratio for calculating the target engine torque during reverse vehicle running;
      calculate the target engine torque by dividing the target drive force by the speed ratio for calculating the target engine torque; and
      control the engine so that the engine torque coincides with the target engine torque.

2. The vehicle drive system as defined in claim 1, wherein the controller further functions to:
   calculate the second value by correcting the first value to a larger value so that the drive force during reverse vehicle operation becomes smaller than the target drive force by a predetermined rate.

3. The vehicle drive system as defined in claim 1, wherein the controller further functions to:
   apply a delay process on the speed ratio for calculating the target engine torque during switching between forward and reverse vehicle operation.

4. The vehicle drive system as defined in claim 3, wherein the controller further functions to:
   apply the delay process on the speed ratio for calculating the target engine torque by limiting a varying speed of the speed ratio for calculating the target engine torque.

5. The vehicle drive system as defined in claim 3, wherein the controller further functions to:
   apply the delay process on the speed ratio for calculating the target engine torque only when the speed ratio decreases before and after switching between forward and reverse vehicle operation.

6. A vehicle drive system comprising:
   an engine;
   an automatic transmission connected to the engine;
   means for detecting a running condition of the vehicle;
   means for detecting an operational condition of the transmission;
   means for calculating a target drive force based on the running condition of the vehicle;
   means for calculating a first value based on the state of the transmission;
   means for setting the first value as a speed ratio for calculating a target engine torque during forward vehicle operation;
   means for setting a second value calculated by correcting the first value to a larger value as the speed ratio for calculating the target engine torque during reverse vehicle running;
   means for calculating the target engine torque by dividing the target drive force by the speed ratio for calculating the target engine torque; and
   means for controlling the engine so that the engine torque coincides with the target engine torque.

* * * * *